(12) United States Patent
Ramaswamy et al.

(10) Patent No.: US 7,478,171 B2
(45) Date of Patent: Jan. 13, 2009

(54) SYSTEMS AND METHODS FOR PROVIDING DIALOG LOCALIZATION IN A DISTRIBUTED ENVIRONMENT AND ENABLING CONVERSATIONAL COMMUNICATION USING GENERALIZED USER GESTURES

(75) Inventors: Ganesh N. Ramaswamy, Ossining, NY (US); Jan Sedivy, Prague (CZ); Stephane H. Maes, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 10/689,094

(22) Filed: Oct. 20, 2003

(65) Prior Publication Data

US 2005/0086382 A1    Apr. 21, 2005

(51) Int. Cl.
*G06F 15/16* (2006.01)
(52) U.S. Cl. .................................. 709/246; 715/863
(58) Field of Classification Search ........... 709/246, 709/203, 205; 715/863; 463/36
See application file for complete search history.

(56) References Cited

U.S. PATENT DOCUMENTS

| 2004/0189720 A1* | 9/2004 | Wilson et al. | 345/863 |
| 2006/0242607 A1* | 10/2006 | Hudson | 715/863 |
| 2007/0259717 A1* | 11/2007 | Mattice et al. | 463/36 |

\* cited by examiner

*Primary Examiner*—Salad Abdullahi
(74) *Attorney, Agent, or Firm*—F. Chau & Associates, LLC (57) ABSTRACT

Systems and methods for providing conversational computing in a distributed multi-modal environment and in particular, systems and methods for enabling a user to conversationally communicate with entities in a distributed network using a portable access device, wherein interaction dialog for communicating with entities in the network is described in a manner that is independent of, e.g., user language, access channel(s), I/O modalities of the access device, and regional/international settings, and wherein the user access device and/or a remote server comprise mechanisms for adapting the interaction dialog based on the user language, user preferences, access device characteristics and or regional/international settings, to thereby enable the user to interact with one or more entities in the network.

1 Claim, 6 Drawing Sheets

SYSTEMS AND METHODS FOR PROVIDING DIALOG LOCALIZATION IN A DISTRIBUTED ENVIRONMENT AND ENABLING CONVERSATIONAL COMMUNICATION USING GENERALIZED USER GESTURES

TECHNICAL FIELD OF THE INVENTION

The present invention relates generally to systems and methods for providing conversational computing in a distributed multi-modal environment. More specifically, the invention relates to systems and methods for enabling a user to conversationally communicate with entities in a distributed network using a portable access device, wherein interaction dialog for communicating with one or more entities in the network is described in a manner that is independent of, e.g., user language, access channel(s), I/O modalities of the access device, and regional/international settings, and wherein the user access device and/or a remote server comprise mechanisms for adapting the interaction dialog based on the user language, user preferences, access channel(s), characteristics of the access device, and or regional/international settings.

BACKGROUND

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices such as cell phones, smart phones, pocket organizers, PDAs, PCs, etc., will offer ubiquitous access, affording the ability to create, manipulate and exchange information anywhere and anytime using interaction modalities most suited to the user's current needs and abilities.

The increasing availability of information, along with the rise in the computational power available to each user to manipulate this information, brings with it a concomitant need to increase the bandwidth of man-machine communication. The ability to access information using various devices, each designed to suit the user's specific needs and abilities at any given time, necessarily means that these interactions should exploit all available input and output (I/O) modalities to maximize the bandwidth of man-machine communication.

The current networking infrastructure is not configured for providing seamless, multi-channel, multi-modal and/or conversational access to resources in a distributed environment. For instance, in a distributed environment where appliances and devices can be controlled by voice commands, for example, the applications, user interfaces, and servers that enable such control are constructed based on the localization and user language of the environment in which such applications are implemented.

By way of example, assume that lights in a public room can be automatically controlled using, e.g., speech commands in a given language, to turn off, turn on or dim the light. Suppose a foreign visitor entering the room wishes to dim the lights. If the visitor does not know the local commands and/or local language, the visitor would not be able to personally control the lights. The visitor may make a certain gesture (e.g., frowning, or saying something in a foreign language), however, that would be understood by an assistant accompanying the visitor to mean that the visitor would like the lights dimmed. In such instance, the human assistant would then be able to proceed with the visitor's request to dim the lights by, e.g., uttering the known command in the appropriate language or by engaging in dialog with another person or entity to dim the lights.

Therefore, in the above example, it is disadvantageous to require a user to interact with a networked entity using particular gestures, e.g., a set of specific verbal commands in a particular language. Currently, the localization of application dialogs (i.e., use for other languages) or the adaptation of dialog components to different regional settings (e.g., format of address) requires redesigning the application for each language, etc.

SUMMARY OF THE INVENTION

Exemplary embodiments of the invention generally include systems and methods for providing conversational computing in a distributed multi-modal environment. Exemplary embodiments of the invention further include systems and methods for enabling a user to conversationally communicate with one or more entities in a distributed network using a portable access device, wherein interaction dialog for communicating with entities in the network is described in a manner that is independent of, e.g., user language, access channel(s), device characteristics (e.g., I/O modalities) of the access device, and/or regional/international settings, and wherein the user access device and/or a remote server comprise mechanisms for adapting the interaction dialog based on user language, user preferences, access device characteristics and/or regional/international settings.

More specifically, in one exemplary embodiment of the invention, a method is provided for enabling a user to conversationally communicate with one or more entities in a network. A user establishes connection to a distributed network using a client device. The client device will obtain a description of one or more commands that enable user interaction with one or more entities in the distributed network, wherein the commands are described independent of user language, access channel, client device I/O (input/output) modality, regional settings or international settings. When the client device receives an input user gesture (e.g., verbal command/ query, GUI command/query, a physical gesture (such as hand motion, blood pressure increase, etc.), which is provided by the user for communicating with a target entity, the client device will process the input user gesture to determine the target entity and invoke a command associated with the target entity.

In another exemplary embodiment of the invention, the commands comprise elementary components of interaction (conversational gestures) that are described using an interaction-based programming model. In another exemplary embodiment of the invention, at least one or all of the commands in the distributed network are part of a predefined, finite set of elementary commands.

In yet another exemplary embodiment, the client access device is configured with a priori knowledge of each conversational gesture within the predefined, finite set of conversational gestures such that the access device is preloaded with (or can obtain) mechanisms for interpreting and adapting each of the commands based on the UI characteristics of the client device, user preference specifications (e.g., user language, type of commands, etc.) and regional/international settings, for example. For example, based on user preferences or device characteristics, the commands (conversational gestures) can be rendered into different languages (German, French, etc.), different modalities/channels (WML, HTML, Voice, multi-modal, etc., different localization/internationalization/regionalization settings (e.g., Belgium account number, U.S. account system, international accounting and routing numbers, address/zip code format depending on the region etc.).

In another exemplary embodiment of the invention, a method for providing conversational communication with entities in a network comprises establishing connection to a distributed network using a client device, obtaining, by the client device, a description of one or more commands that enable user interaction with one or more entities in the distributed network, wherein the commands are described independent of user language, access channel, client device I/O (input/output) modality, regional settings or international settings, receiving as input, by the client device, a user gesture provided by the user for communicating with a target entity, and adapting the commands in accordance with user preference specifications or characteristics of the client device, or both, to thereby invoke a command associated with the input user gesture. In yet other exemplary embodiments of the invention, the process of adapting can be performed by client-side processing, server-side processing or a combination of client-side and server-side processing.

These and other exemplary embodiments, aspects, features, and advantages of the present invention will become apparent from the following detailed description of the exemplary embodiments, which is to be read in connection with the accompanying drawings.

DETAILED DESCRIPTION OF EXEMPLARY EMBODIMENTS

Exemplary embodiments of the invention generally include systems and methods for providing conversational computing in a distributed multi-modal environment. More specifically, exemplary embodiments of the invention include systems and methods for enabling a user to conversationally communicate with one or more entities in a distributed network using a portable access device, wherein interaction dialog for communicating with entities in the network is described in a manner that is independent of, e.g., user language, access channel(s), characteristics (e.g., I/O modalities) of the access device, and/or regional/international settings, and wherein the user access device and/or a remote server comprise mechanisms for adapting the interaction dialog based on user language, user preferences, access device characteristics and/or regional/international settings. Accordingly, systems and methods according to exemplary embodiments of the invention as described herein allow a user to access and control networked entities (e.g., appliances, devices, resources, etc.) in a distributed environment, via multi-modal, multi-channel, or conversational interactions, regardless of the user's language or location and using any suitable pervasive computing device regardless of its I/O modality, for example.

The term "channel" used herein refers to a particular renderer, device, or a particular modality. Examples of different modalities/channels comprise, e.g., speech such as VoiceXML, visual (GUI) such as HTML (hypertext markup language), restrained GUI such as WML (wireless markup language), CHTML (compact HTML), and HDML (handheld device markup language), XHTML—MP (mobile profile) and a combination of such modalities. The term "multi-channel application" refers to an application that provides ubiquitous access through different channels (e.g., VoiceXML, HTML), one channel at a time. Multi-channel applications do not provide synchronization or coordination across the different channels.

The term "multi-modal" application refers to multi-channel applications, wherein multiple channels are simultaneously available and synchronized. Furthermore, from a multi-channel point of view, multi-modality can be considered another channel.

Furthermore, the term "conversational" or "conversational computing" as used herein refers to seamless multi-modal dialog (information exchanges) between user and machine and between devices or platforms of varying modalities (I/O capabilities), regardless of the I/O capabilities of the access device/channel, preferably, using open, inter operable communication protocols and standards, as well as a conversational (or interaction-based) programming model that separates the application data content (tier 3) and business logic (tier 2) from the user interaction and data model that the user manipulates (i.e., using a programming by interaction paradigm as discussed in detail below). The term "conversational application" refers to an application that supports multi-modal, free flow interactions (e.g., mixed initiative dialogs) within the application and across independently developed applications, preferably using short term and long term context (including previous input and output) to disambiguate and understand the user's intention. Conversational applications can utilize NLU (natural language understanding).

Figure 1:
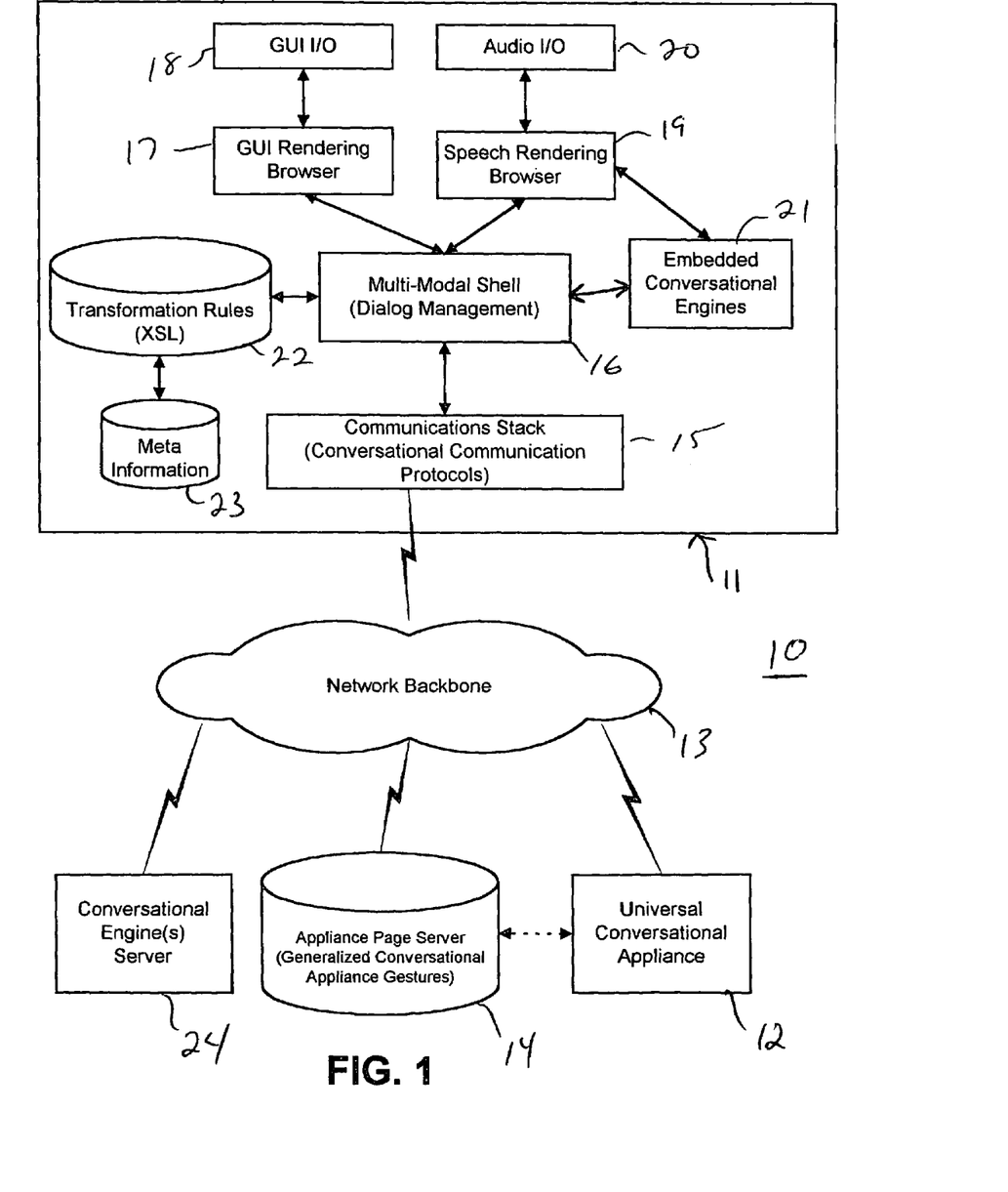
FIG. 1 is a block diagram of a system for providing conversational communication with entities in a distributed network according to an exemplary embodiment of the invention.

Referring now to FIG. 1, a block diagram illustrates a system according to an exemplary embodiment of the present invention for providing conversational communication with entities (appliances, devices, servers, resources, etc.) in a distributed network environment. The system (10) comprises a user access device (11) that can access and control, or otherwise communicate with, one or more universal conversational appliances (12) (or "UCA") in a distributed communications network (13). The access device (11) may comprise, for example, a wireless device such as a PDA, cell phone, or remote control device, etc. The network (13) represents, in general, various types of networks/network connectivity including, for example, a wireless network, an IP network (e.g., the Internet, WAN, LAN), a spontaneous, ad hoc network (such as Bluetooth), etc., and any combination of networks. It is to be understood that other "channels" and networks/connectivity can be used to implement the present invention and nothing herein shall be construed as a limitation of the scope of the invention.

The system (10) further comprises an appliance page server (14) that is associated with one or more of UCAs (12). The page server (14) comprises one or more applications that describe a user interface (UI) and allowable user interaction with the UCA (12) (or other registered UCAs) in a channel/modality/language/region independent manner, to thereby enable conversational (or multi-modal or multi-channel) interaction. The server (14) may be distributed over the network (13) or reside locally in an associated UCA (12) (as indicated by the dotted line).

More specifically, the appliance page server (14) comprises an application/web server that includes one or more applications that enable a user to conversationally communicate and interact with UCAs (12) present in the network (13) using the access device (11). In one exemplary embodiment of the present invention, the applications are authored using a programming model in which conversational dialog is described in a manner that is independent of, e.g., a user's language, the communication modality of the client device (11), and the regional/local/international settings of the network environment. In particular, the applications are written using an "interaction-based" programming language in which the conversational dialog (interaction logic) is described separately, and independent of, the description of the transformation for a given channel, user language, user preference, and regional settings, for example. In addition, the interaction logic for implementing the conversational dialog is written independent of the business logic for driving the backend logic and data associated with one or more of the UCAs (12).

Furthermore, in one exemplary embodiment, the interaction logic of an application abstracts the application in terms of a finite set of interaction primitives or "conversational gestures". The "conversational gestures" (alternatively referred to herein as generalized "commands") define elementary components of interaction that are described in a channel/modality/language/region independent manner. The conversational gestures are defined in a manner such that they can universally be applied for various types of possible user interaction with various types of networked entities. For example, "conversational gestures" such as "switch on" and "switch off" can be applied in applications that are written for interacting with lights, televisions, computers, or any other networked device that can be switched on or off.

In one exemplary embodiment of the invention, an application for a given UCA (12) is written using a predefined arrangement/sequence of one or more "conversational gestures" to describe the allowable commands for interacting with that UCA (12). In one exemplary embodiment, the "conversational gestures" for a given application are selected from a universally predefined, finite set of conversational gestures. The access device (11) is configured with a priori knowledge of each conversational gesture within such predefined set such that the access device (11) is capable of interpreting and adapting each conversational gesture based on the UI characteristics of the access device (11), user preference specifications (language, type of commands, etc.) and regional settings, for example. Various exemplary embodiments for implementing an interaction-based application with generalized conversational gestures will be described below.

In one exemplary embodiment of the invention, the access device (11) can be used for accessing and controlling and otherwise communicating with the UCA (12) (or other entities) that are registered with the server (14) for example, in the distributed domain. The access device (11) is configured for discovering, registering and negotiating with "conversationally aware" entities in the network (13) including, for example, the UCA (12) or the page server (14). More specifically, in one exemplary embodiment of the invention, when the access device (11) enters a given distributed network environment and "discovers" other conversationally aware entities, the access device (11) will proceed with a "registration" and "negotiation" process, which enables the access device (11) to acquire the relevant "concepts" that enable interaction with entities in the distributed environment. For example, the relevant "concepts" may comprise a description of all registered entities and corresponding commands (conversational gestures) that are supported in the distributed environment. As noted above, the conversational gesture(s) for a given entity define the interaction dialog between a user and the entity.

In addition, in one exemplary embodiment of the invention, the access device (11) operates to adapt the interaction dialog (as described by the conversational gesture(s)) in accordance with user preferences and device characteristics, for example. In particular, as noted above, in one exemplary embodiment of the invention, the set of conversational gesture(s) associated with a given environment are essentially a subset of conversational gestures of a universally predefined, finite set of conversational gestures, which are known a priori by the access device (11). And the access device (11) comprises a mechanism for interpreting and adapting such conversational gestures. Therefore, when the access device (11) acquires the relevant "concepts" in a distributed environment, the access device (11) can interpret the acquired concepts and adapt the interaction dialog, to thereby enable the user to interact with a UCA (12). For example, the access device (11) can translate a generalized gesture of the user (e.g., voice command, physical movement, GUI input, etc.), or otherwise map the user's gesture to a corresponding "conversational gesture" to thereby invoke a registered command associated with the UCA (12). Furthermore, the access device (11) can render the conversational gestures into different languages, modalities, channels, and local/international/regional settings based on default specifications, user preferences and/or device characteristics. For example, based on the user preference and/or device characteristics, conversational gestures can be rendered into different languages (German, French, etc.), different modalities/channels (WML, HTML, Voice, multi-modal, etc.), different localization/internationalization/regionalization settings (e.g., Belgium account number, U.S. account system, international accounting and routing numbers, address/zip code format depending on the region etc.). These concepts will be discussed in further detail below.

Referring again to FIG. 1, in one exemplary embodiment of the present invention, the access device (11) comprises a communications stack (15), a multi-modal shell (16) (or dialog manager), a GUI rendering browser (17), a GUI I/O device (18) (e.g., display), a speech rendering browser (19), audio I/O devices (20) (e.g., microphone, speaker), one or more embedded conversational engines (21), and a database of transformation rules (22) and meta-information (23).

The communications stack (15) implements communications protocols that enable network connectivity and communication (e.g., Bluetooth, HTTP, WAP, etc.). Furthermore, in one exemplary embodiment, the communications stack (15) implements conversational communication protocols that enable real-time DSR (distributed speech recognition) applications, such as protocols for real-time coding of speech and transmission thereof, and protocols for real-time exchange of control information between distributed devices/applications for remote processing (e.g., speech processing), using the methods and techniques disclosed, for example, in U.S. patent application Ser. No. 10/104,925, filed on Mar. 21, 2002, entitled "Conversational Networking Via Transport, Coding and Control Conversational Protocols," which is commonly assigned and fully incorporated herein by reference.

Moreover, the communications stack (15) can implement conversational protocols that enable conversational discovery, registration and negotiation between networked devices/applications in a distributed environment, such as those protocols described in the above-incorporated U.S. patent application Ser. No. 10/104,925, as well as U.S. patent application Ser. No. 09/806,425, entitled "System and Method For Providing Network Coordinated Conversational Services," and U.S. patent application Ser. No. 09/806,565, entitled: "Conversational Computing Via Conversational Virtual Machine", which are commonly assigned and fully incorporated herein by reference. Such conversational protocols further enable automatic and coordinated sharing of conversational functions and resources between local and remote applications/devices/servers in a distributed environment.

In one exemplary embodiment, the dialog manager (16) manages and adapts the interaction dialog using a MVC paradigm as described below with reference to FIG. 3 and based on specifications of user preferences and/or device characteristics. More specifically, by way of example, the dialog manager (16) parses and processes pages received by the server (14), which include conversational gestures that describe the interaction logic, to generate a mapping that enables user input gestures (e.g., speech commands, GUI commands, etc.) to be mapped/translated to the conversational gestures within a received page using, for example, relevant transformation rules (22) and/or meta-information (23), which are preloaded in the access device (11). Furthermore, the dialog manager (16) can generate one or more modality-specific scripts using suitable transformation rules (22) and/or meta-information (23), which are processed by corresponding rendering browsers (e.g., the GUI browser (17) and speech browser (19)) registered with the dialog manager (16), to thereby present a conversational user interface in one or more (synchronized) modalities (e.g., voice or GUI).

Various architectures and protocols for implementing the dialog manager (16) (multi-modal shell) are described, for example, in U.S. patent application Ser. No. 09/544,823, filed on Apr. 6, 2000, entitled: "Methods and Systems For Multi-Modal Browsing and Implementation of A Conversational Markup Language", U.S. patent application Ser. No. 09/507,526, filed on Feb. 18, 2000 entitled: "Systems And Methods For Synchronizing Multi-Modal Interactions", and U.S. patent application Ser. No. 10/007,092, filed on Dec. 4, 2001, entitled "Systems and Methods For Implementing Modular DOM (Document Object Model)-Based Multi-Modal Browsers", all of which are commonly assigned and fully incorporated herein by reference. Details regarding exemplary embodiments and functions of the dialog manager (16) will be described below.

The access device (11) further comprises one or more embedded speech engines (21) for providing speech-based processing for the speech rendering browser (19). By way of example, the speech engines (21) may include an ASR (automatic speech recognition) engine, a NL (natural language) parser engine, a TTS (text-to-speech) engine, and a SPID (speaker identification/verification) engine, and/or any other engines/processors that are used for pre/post processing audio (speech) signals, such as uplink/downlink codecs for encoding/decoding audio data transmitted between the access device (11) and remote engine server (24), for example. An ASR engine enables the system to understand spoken utterances of a user for the purpose of processing spoken commands and other spoken input received from the user. An NL parser, which is employed for natural language understanding applications, receives data streams from the ASR engine and processes the data. A TTS engine converts text to speech and enables the access device (11) to playback synthesized prompts from a text string, for example. A SPID engine is used for speaker recognition when the access device (11) supports biometric identification/verification, for example.

It is to be understood that the architecture of the access device (11) of FIG. 1 is merely exemplary of an access device having sufficient resources for implementing various components such as embedded speech engines and a voice browser, for example (fat client configuration). In other embodiments wherein resources of the access device (11) are limited, various components of the access device can be distributed over the network (13) (thin client configuration). For instance, as shown in FIG. 1, the access device (11) may access a remote conversational engine server (24) for obtaining certain speech services when the access device (11) does not have the necessary resources for local speech processing. Furthermore, the voice browser (19) may be remotely located and accessible over the network (13). In such instances, various conversational protocols (15) can be implemented for streaming audio and exchanging control messages for enabling remote control of the engines and synchronization of the different rendering views, as described in the above-incorporated U.S. patent application Ser. No. 10/104,925.

Furthermore, in other exemplary embodiments of the present invention where the access device has limited resources, adaptation of the interaction dialog may be performed in a remote server. For example, the access device (11) can acquire the relevant interaction concepts in a given distributed environment, as well as receive an input user gesture, and then send the relevant interaction concepts and input user gesture to a designated server that has the transformation mechanisms to process the user gesture and adapt the interaction dialog. For instance, the designated server may be preloaded with the transformation rules and meta information that is needed to adapt the interaction dialog based on user preference specifications and/or the characteristics of the access device, for example. In such case, the designated server can ship processing results to the access device, if necessary.

As noted above, systems and methods according to exemplary embodiments of the invention, which enable conversational communication with entities in a distributed environment, are implemented using interaction-based programming models in which the interaction dialog (conversational gestures) are described in a "user-interface" neutral manner. In particular, interaction-based applications are authored using a programming model in which the application data content (tier 3) and business logic (tier 2) are separate from the user interaction and data model that the user manipulates. Furthermore, the data models and description of the interaction dialog are separate and independent of the description of the transformation of such user interaction dialog for given channels, user preferences, regional settings, etc. Conversational gestures may be encoded either declaratively (e.g., using XML) or imperatively/procedurally (e.g., using beans), for example.

Figure 2:
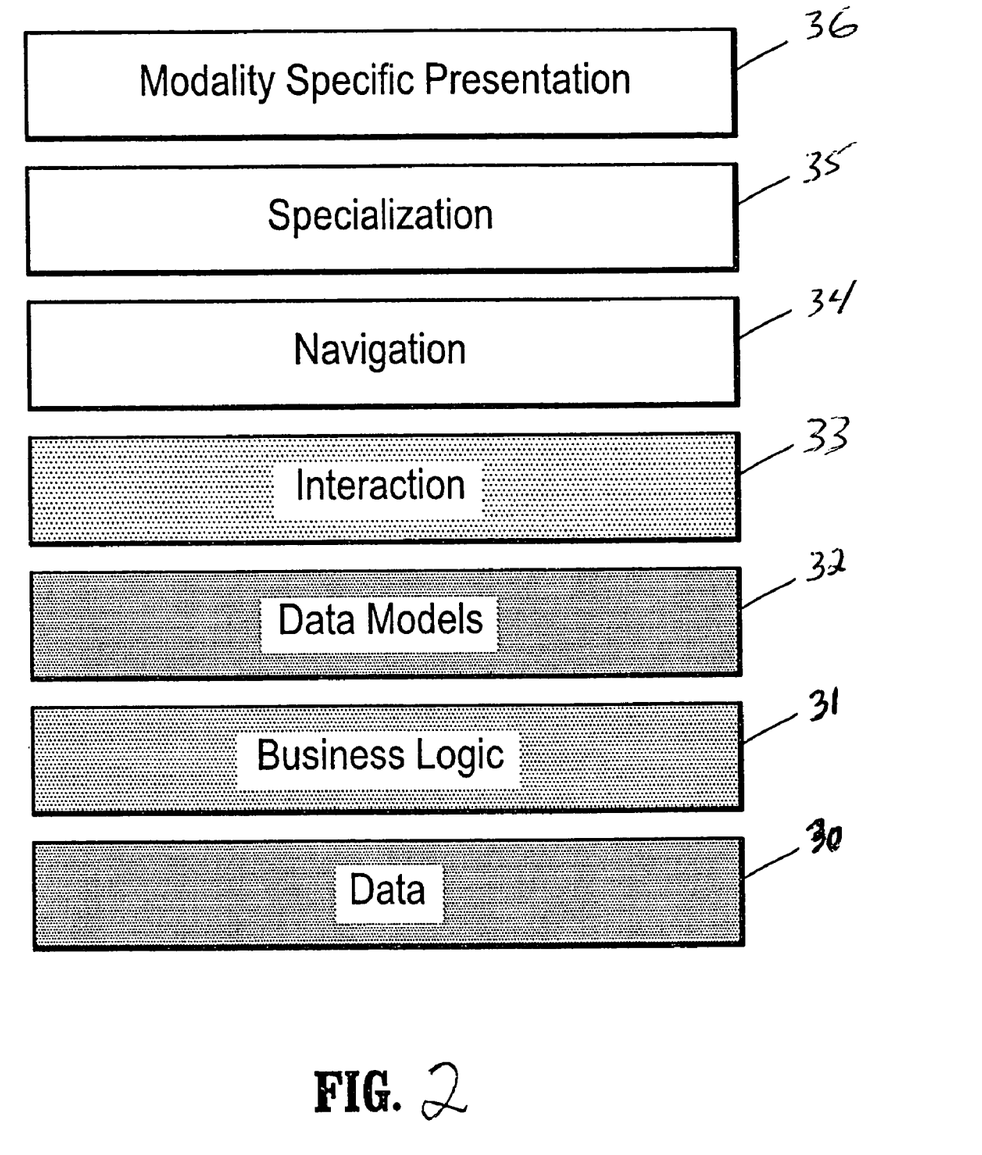
FIG. 2 is a diagram illustrating an application framework which may be implemented according to an exemplary embodiment of the present invention for building an interaction-based application comprising conversational gestures that describe the interaction dialog with entities in a distributed network.

FIG. 2 is a diagram illustrating a single authoring programming framework which can be used for implementing an interaction-based conversational, multi-modal or multi-channel application, according to exemplary embodiments of the invention. A single authoring, interaction-based programming model separates various programming layers comprising a backend data layer 30, a business logic layer 31, a data model layer 32, an interaction logic layer 33, a navigation layer 34, a specialization layer 35, and a modality-specific presentation/rendering layer 36.

The backend data layer (30) comprises a backend legacy database. The business logic layer (31) is the portion of an application that contains the logic, i.e., encoded set of states and conditions that drive the evolution of the application, as well as variable validation information. The data models layer (32) (or data type primitives) comprises one or more defined data models for data items to be populated by the user interaction, and declares the user interface that makes up the application dialogues. The interaction layer (33) abstracts the application in terms of a finite set of interaction primitives (e.g., conversational gestures) to encapsulate the interaction logic in a modality-independent manner. A modality-specific presentation of the application is provided based on the descriptions provided by the modality-specific presentation layer (36). The specialization layer (35) provides a mechanism for cosmetic altering of one or more features of a presentation, in one or more modalities. Cosmetization or specialization is a method for optimizing an application for a given channel (device, modality or browser) or a class of channel (e.g., Nokia cell phones, etc.). For example, specialization may include providing a background for a page, changing the layering of a page into frames, fragmenting a WML document across multiple deck of cards, specifying the voice characteristics for a TTS prompt or an audio prompt to play back, changing the message to present to the user when spoken versus the displayed message, skipping a gesture not needed in a given modality, etc.

In one exemplary embodiment of the present invention, a single authoring, interaction-based programming model can be implemented using a declarative interaction-based markup language such as described, for example, in the above incorporated U.S. patent application Ser. No. 09/544,823. More specifically, U.S. Ser. No. 09/544,823 describes a novel programming paradigm for an interaction-based CML (Conversational Markup Language) (alternatively referred to as IML (Interaction Markup Language)). One embodiment of IML preferably comprises a high-level XML (eXtensible Markup Language)-based script, which can be implemented herein for specifying interaction "dialogs" or "conversations" between user and machine using "conversational gestures." As noted above, conversational gestures are elementary dialog components (interaction-based elements) that characterize the dialog interaction with the user. Each conversational gesture provides an abstract representation of a dialog independent from the characteristics and UI offered by the device or application that is responsible for rendering the presentation material. The conversational gestures are modality-independent building blocks that can be combined to represent any type of intent-based user interaction.

In general, user interactions authored in gesture-based IML can have the following format:

```
<iml>
    <model id="model_name"> ... /model>
    <interaction model_ref="model_name"
        name="name". ..../interaction.
</iml>
```

The IML interaction page defines a data model component (e.g., based on the XFORMS standard) that specifies one or more data models for user interaction. The data model component of an IML page declares a data model for the fields to be populated by the user interaction that is specified by one or more conversational gestures. In other words, the IML interaction page can specify the portions of the user interaction that is binded on the data model portion. The IML document defines a data model for the data items to be populated by the user interaction, and then declares the user interface that makes up the application dialogues. Optionally, the IML document may declare a default instance for use as the set of default values when initializing the user interface.

In one exemplary embodiment, the data items can be defined in a manner that conforms to XFORMS DataModel and XSchema. The data models are tagged with a unique id attribute, wherein the value of the id attribute is used as the value of an attribute, referred to herein as model_ref on a given conversational gesture element, denoted interaction, to specify the data model that is to be used for the interaction.

As noted above, in one exemplary embodiment of the present invention, the conversational gestures that can be used for describing a user interface/user interaction are predefined and finite (although an application developer can expand the set if necessary). The conversational gestures are defined in a manner such that they can universally be applied for various types of possible user interaction with various types of appliances. For example, conversational gestures "switch on" and "switch off" can be applied in applications that are written for interacting with lights, televisions, computers, or any other device that can be switched on or off. Examples of other gestures and gesture components that can be universally applied include, for example, select (selection out of a list (exclusive or not)), message (playback prompt to a user), submit (submission of an action), free input, etc.

More specifically, as described in the above-incorporated U.S. Ser. No. 09/544,823, a conversational gesture message can be used to convey information messages to the user, which may be rendered, for example, as a displayed string or a spoken prompt. In addition, a conversational gesture select can be used to encapsulate dialogs where the user is expected to select from a set of choices. The select gesture encapsulates the prompt, the default selection and the set of legal choices. Other conversational gestures are described in the above-incorporated Ser. No. 09/544,823.

By way of example, the following IML document may be implemented to define the user interaction with a soda machine:

```
<iml>
<model id="SodaMachine">
    <string name= "command" enumeration= "closed">
        <value>drink</value>
        <value>credit</value>
    </string>
    <number name= "credit"/>
    <string name = "drink"
```

-continued

```
            enumeration= "dynamic"
            src= "http://localhost/servlets/coke-machine/drinks"/>
    </model>
    <interaction   name = "SodaMachine"
                model_ref = "sodaMachine">
      <caption>Soda Machine</caption>
      <menu>
        <choices>
           <choice value = "#credit">Insert a coin</choice>
           <choice value = "#drink">Select drink</choice>
        </choices>
      </menu>
      <dialog id= "credit"
           action = "submit">
        <assign name = "SodaMachine.command" expr= "credit"/>
        <input name = "SodaMachine.credit">
           <caption>How much would you like to deposit?</caption>
           <help> You can deposit money into this coke machine - - this
           wil give you
               credit for obtaining the drink of your choice
           </help>
        </input>
      </dialog>
      <dialog id= "drink"
           action= "submit">
        <assign name = "SodaMachine.command" expr= "drink"/>
        <select name = "SodaMachine.drink">
           <caption>What would you like to drink?</caption>
           <help>You can pick one of the available drinks. What would
you like to drink?
           </help>
        </select>
      </dialog>
      <submit target= "http://localhost/servlets/soda/executeRequest.class">
           <message>Submitting your request to the soda
              machine.
           </message>
      </submit>
    </interaction>
</iml>
```

The above exemplary IML document first declares a data model for the fields to be populated by the user interaction: the field command is an enumeration of type string with a fixed set of valid values; field drink is an enumeration of type string where the range of valid values is dynamic i.e., determined at runtime; and the field credit of type number is an example of another predefined atomic type number. The element interaction specifies the various portions of the user interaction. The soda machine allows the user to either deposit some money or to pick a drink—these possible user actions are encapsulated in separate conversational gestures. The first gesture within element interaction is a menu that allows the user to pick one of the available actions. Each user action is encapsulated within a separate dialog element that each have an action attribute with value set to submit, whereupon completion of the gesture, interaction proceeds to gesture submit that is responsible for submitting the expressed user intent to the back-end application.

The gesture dialog for the first of the possible user actions obtains a value for field credit from the user. The gesture dialog for selecting a drink uses a select gesture to allow the user to pick one of the available drinks. The list of available choices—like the list of acceptable values for the corresponding enumeration in the data model—is dynamic and is looked up at runtime. The gestures input and select in this example use IML elements caption and help to encapsulate the user prompt and help text. These elements can be further specialized to include modality-specific content where necessary (i.e., specialization).

It is to be understood that the declarative framework described above is just one exemplary embodiment for implementing a single-authoring, interaction-based application according to the invention, and that other languages may be used. For example, in other exemplary embodiments of the invention, imperative/procedural conversational dialogs may be implemented (e.g., beans, Javabeans) that are based on the programming paradigm of separating the data model and description of the application in terms of interaction versus the description of the transformation for a given channel, user preference, regional settings, etc. Such dialog components can be written abstractly at the level of the data model and interaction description, and provide rendering face functions that produce a rendered version of the component for a given target modality, channel, language, region, user preference, etc. These rendering face functions can be classes that are derived (inherited) from the modality/channel/language-independent representation of the application. For example, a JSP(Javaserver Pages)/beans framework as described in U.S. patent application Ser. No. 09/837,024, filed on Apr. 18, 2001, entitled "Systems and Methods For Providing Conversational Computing Via JavaServer Pages and Javabeans", and U.S. patent application Ser. No. 10/007,084, filed on Dec. 4, 2001, entitled "Reusable VoiceXML Dialog Components, Subdialogs and Beans, both of which are commonly assigned and incorporated herein by reference, can be used for implementing programming by interaction via server-side or client-side processing of a predetermined set of interaction components (e.g., dialog beans).

Figure 3:
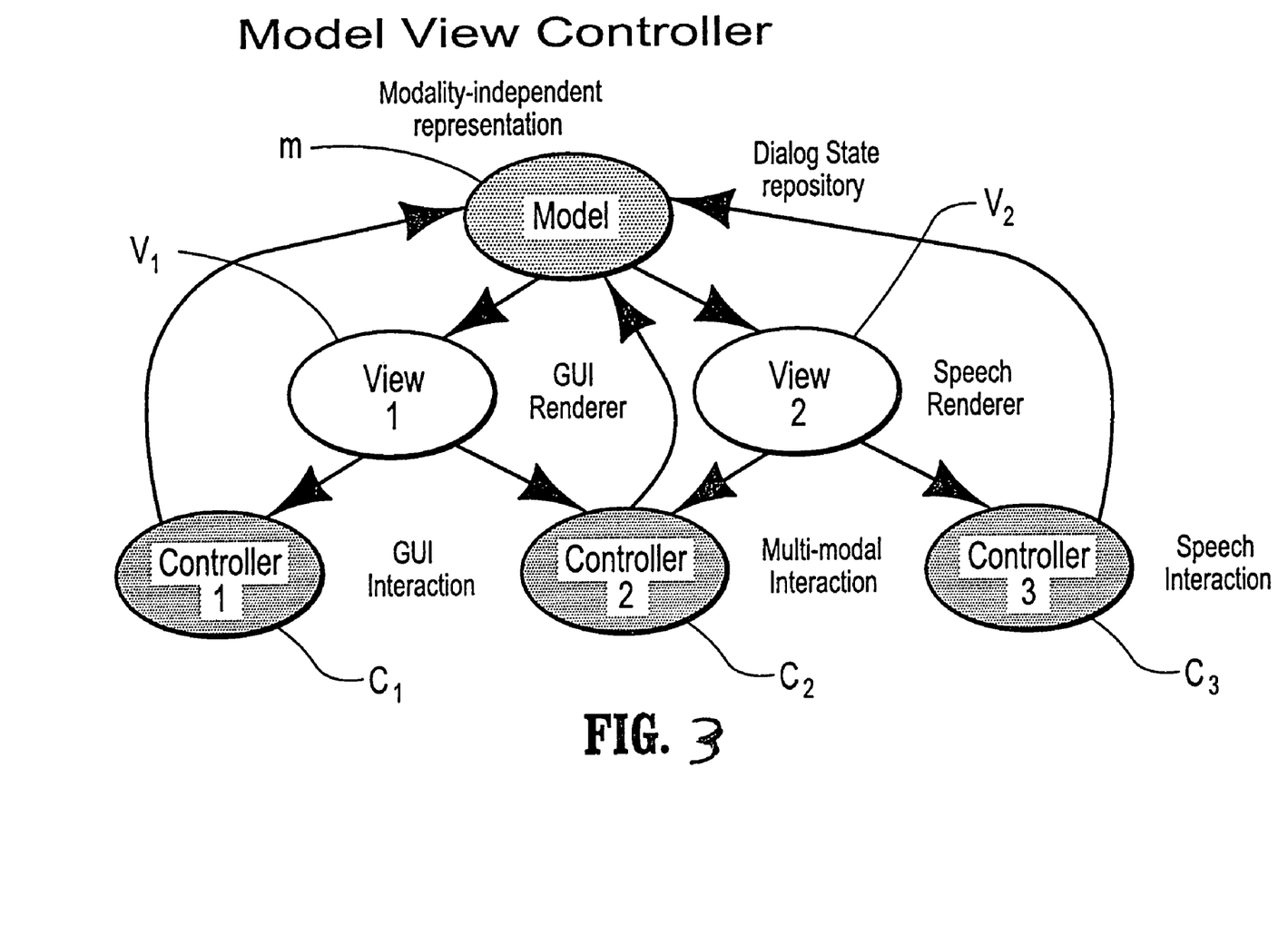
FIG. 3 is a diagram illustrating a MVC (model-view-controller) paradigm which can be implemented according to an exemplary embodiment of the present invention as a method for managing and adapting interaction dialog to enable conversational communication with entities in a distributed network.

FIG. 3 is a diagram illustrating an MVC (model-view-controller) paradigm that can be implemented for managing and adapting the interaction dialog according to an exemplary embodiment of the invention. The MVC paradigm is described in detail in U.S. patent application Ser. No. 09/544,823, for example. Briefly, MVC (model-view-controller) paradigm as illustrated in FIG. 3 is based on a single information source, model M (e.g., conversational gestures described using a declarative IML model) that is mapped to a plurality of views (V1, V2) (e.g., different synchronized channels) and manipulated via a plurality of controllers C1, C2 and C3 (e.g., different browsers such as a speech, GUI and multi-modal browser). With this paradigm, a conversational system can be implemented using a plurality of controllers C1, C2, and C3 that act on, transform and manipulate and adapt the same underlying model M to provide synchronized views V1, V2 (i.e., to transform the single model M to multiple synchronous views). The synchronization of the views is achieved by generating all views from the single unified representation, M, which is continuously updated. Synchronization can be achieved using an abstract tree structure that is mapped to channel-specific presentations tree structures using transformation specifications. The transformations provide a natural mapping among the various views. These transformations can be inverted to map specific portions of a given view to the underlying models. In other words, any portion of any given view can be mapped back to the generating portion of the underlying modality-independent representation, M, and, in turn, the portion can be mapped back to the corresponding view in a different modality by applying appropriate transformation rules.

In one exemplary embodiment of the invention, the Model of an MVC framework as shown in FIG. 3 represents the interaction dialog (conversational gestures) of an application, which is abstractly described in a way that is independent of the target channel/modality/user language/regionalization, etc. At that level, the application is fully functional, independently of the modality/channel/language or platform where the application dialog is rendered. The application dialog can then be adapted using transformation rules that depend, for example, on the target channel, user preferences, device characteristics, regional settings, etc.

Figure 4:
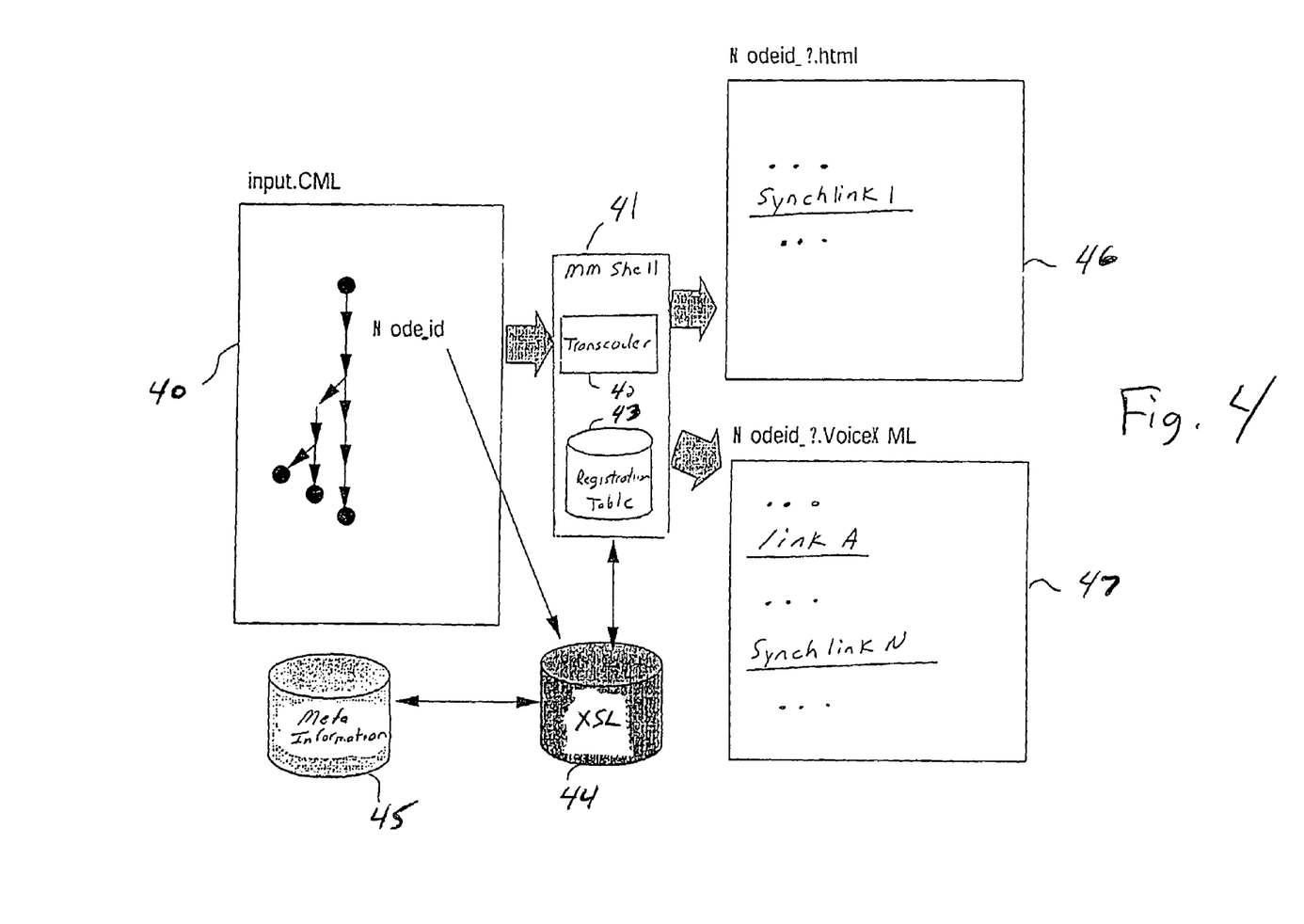
FIG. 4 is a diagram illustrating a system/method which may be implemented according to an exemplary embodiment of the present invention for interpreting and adapting interaction dialog to enable conversational communication with entities in a distributed network.

FIG. 4 is a diagram illustrating a system/method which may be implemented according to an exemplary embodiment of the present invention for interpreting and adapting interaction dialog to enable conversational communication with entities in a distributed network. More specifically, FIG. 4 illustrates a system/method for managing and adapting interaction dialog that is described using a declarative IML implementation with tight synchronization across at least two modalities or devices based on the MVC paradigm discussed above in FIG. 3. An input IML file (40) is fetched by the multi-modal shell (41) from an appliance server using any conventional transport protocol, e.g., HTTP, WAP, Bluetooth, etc. The input XML file (40) is illustrated as comprising a sequence of elementary dialogs (conversational gestures represented by the "dots" or nodes in the IML page (40). The arrows represent the flow of the dialog declared in the IML page. In particular, when expressed graphically, the dialog is represented by a tree, i.e., sequential list of gestures with bifurcation (and possible loops).

Each component gesture (i.e., node) in the IML file (40) is tagged with a specific node_id (e.g., an infix, or prefix path across the tree, or any other numbering). The multi-modal shell (41) keeps track of each node_id and the tree/graph structure of the IML file (40) to build a registration table (43). The multi-modal shell (41) comprises a transcoder module (42) for dynamically transcoding each gesture (dialog component) based on its type/nature into a corresponding component for each registered modality (e.g., GUI and speech). For instance, as illustrated in FIG. 4, the gesture/dialog component that is tagged with "Node_id" is dynamically transcoded to an HTML component (46) and a VoiceXML component (47), which are shipped to their respective presentation browsers (e.g., the visual browser and speech browser, respectively) for rendering. The pages (46, 47) are synchronized in the sense that any event on one of the gestures in one of the browsers is sent to the multi-modal shell (41) which utilizes the graph/tree to determine how to update the page (e.g., by transcoding a new node_id, or by following a link and updating the entire IML page).

The dynamic transcoding from IML to synchronized modality pages can be achieved using transformation rules such as XSL transformation rules that are stored in database (44). Each gesture/dialog component in the IML file (40) is associated with a default XSL transformation rule. The transformation rules in database (44) can be overwritten based on meta-information stored in a local database (45) of the device. The meta-information may include, for example, device/ browser preferences (e.g., capability-based information regarding the capabilities of the device), user preferences/ customizations, and application preferences. In addition, the transformation rules (44) may be overwritten by downloading new XSL transformation rules from a content provider of the IML page (e.g., as indicated via a URL in the XML file). In other exemplary embodiments of the invention, it is to be appreciated that the adaptation/transformation of conversational gestures can be performed using JSP or Java beans. For instance, a java bean can be associated with each conversational gesture, which carries its own rendering face functions for each modality (via JSP), for example.

Figure 5:
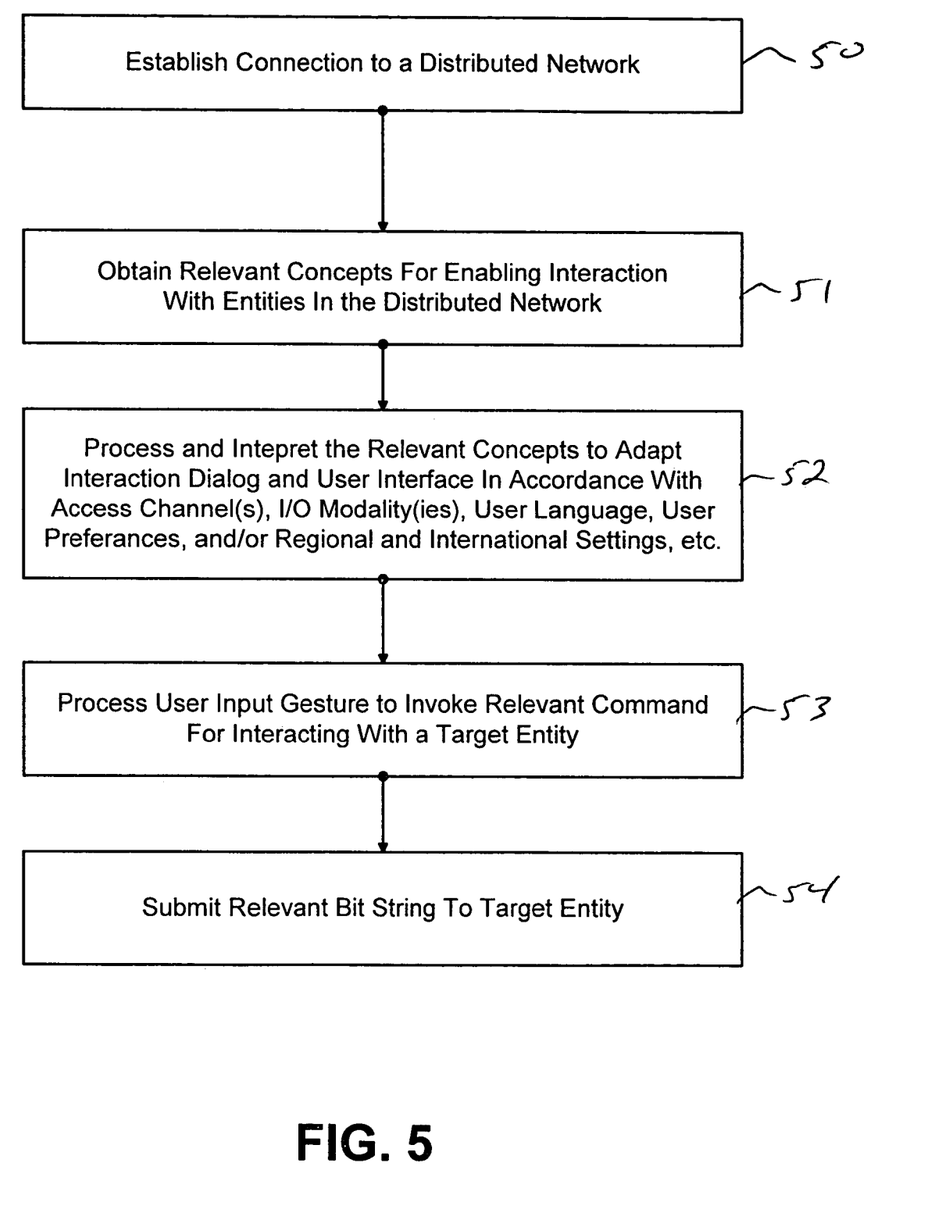
FIG. 5 is a diagram illustrating a method for providing conversational communication with entities in a distributed network according to an exemplary embodiment of the invention.

Referring now to FIG. 5, a flow diagram illustrates a method for providing conversational communication with entities in a distributed network according to an exemplary embodiment of the present invention. In one embodiment, a user can communicate with entities in a distributed network by using a portable access device (or remote control device) to establish a connection to the distributed network (step 50) and obtain relevant "concepts" for enabling interaction with entities in the distributed network (step 51). In one exemplary embodiment of the invention, the processes of establishing a communication link and obtaining the relevant interaction "concepts" can include various processes such as conversational discovery, registration and negotiation, which occur between the user access device and an application server and/or one or more entities (e.g., UCAs) in the network. Various protocols that may be implemented according to one exemplary embodiment of the invention for performing conversational discovery, registration and negotiation are disclosed, for example, in the above incorporated patent applications U.S. Ser. Nos. 10/104,925, 09/806,425 and 09/806, 565.

For example, conversational discovery may be performed using suitable methods to "discover" network entities that are "conversationally aware" (e.g., entities that can be discovered using predefined conversational protocols and exchange the necessary information to be conversationally controlled). In one exemplary embodiment, conversational discovery is performed using a "broadcast and listen" process, which allows creation of dynamic and spontaneous networks such as Bluetooth. More specifically, the user's access device can broadcast a request for a handshake (discovery) using suitable communication protocols and listen for responses from the network entities. In one embodiment, each entity in the distributed network can separately communicate with the user's access device and respond to a handshake request. In another embodiment, network entities are registered with a dedicated server, which communicates with the user's access device on behalf of such registered entities. In yet another embodiment, the entities communicate with the user's access device but are registered with a server which acts as gateway or interface between the access device and entities. In yet another exemplary embodiment of the present invention, a default server setting can be used which registers the "address" of each network entity, which enables the user's access device to communicate with the server and obtain a list of registered entities. Information that is exchanged via the discovery protocols includes, for example, broadcast requests for handshake or listening for requests, exchange of device/entity identifiers, exchange of handles/pointers for first registration and negotiation, etc.

Next, in one exemplary embodiment, conversational discovery of one or more network entities leads to a conversational registration process, which enables the user access device to obtain the relevant concepts that enable interaction with the one or more discovered network entities. Such relevant concepts include, for example, a list of commands (conversational gestures) supported by the discovered entities, together with return handles/events to return to the corresponding entity application upon activation of such commands. In addition, registration information may include addresses for obtaining necessary data files (vocabularies, grammars, etc.) for performing certain conversational functions on the user's access device, or addresses of remote engines that can be accessed by the user's access device to perform remote processing or certain conversational engine tasks (e.g. a server that will perform a speech recognition task, etc). The user access device can obtain the relevant concepts for enabling interaction with entities in the distributed network either directly from each discovered entity, or by communicating with a local server that provides a list of all registered entities and the corresponding registered commands that are supported by such entities in the distributed network.

Next, a registration process leads to a negotiation process in which information is exchanged between the user access device and network entity or entities to negotiate a suitable network topology such as master-slave, peer-to-peer, etc, and coordinate the communication. Network configuration can be based upon, for example, registration of needs and capabilities of each of the network entities, wherein the network entities and applications can vote for a given temporary configuration during negotiation or such configuration can be imposed by the application, etc. In one exemplary embodiment, negotiation results the user's access device controlling and driving the conversation.

As a result of the above processes, the user access device obtains the set of elementary commands (or conversational gestures) that are applicable in the distributed environment, which elementary commands describe the interaction dialog for communicating with the entities in a channel/modality/language/region independent manner. Thereafter, the access device can process and interpret the relevant commands (e.g., conversational gestures) to adapt the interaction dialog and user interface in accordance with the access channel(s), I/O modalities of the access device, the user language, prespecified user preferences and/or regional/international settings, etc. (step 52).

More specifically, as noted above, in one exemplary embodiment, the set of conversational gestures in the distributed environment for a given application are a subset of a predefined, finite set of conversational gestures and the user access device is preloaded with the relevant transformation mechanisms. Such transformation mechanisms include, for example, rendering face functions for interaction (dialog) objects (imperative programming) or XSL transformation rules (declarative programming), for each conversational gesture within such predefined set, which allows the access device to process, interpret and adapt the conversational gestures (interaction components) in the given distributed environment based on the UI characteristics of the device, user preferences (language, type of commands, etc.) and regional settings, for example as specified via the transformation specifications.

When the user desires to interact with a desired entity, the user will input a desired gesture (command or query) to the access device and the access device will process the input user gesture to determine the target device and invoke a relevant command of the target device (step 53). For instance, for a speech-enabled access device, the user can utter a verbal command (or query) or other utterance to access or control a certain entity. For a GUI-enabled access device, the user may type in a certain gesture (command or query) in a given field of a displayed UI. Moreover, for a video (camera, screen) enabled access device, the user can input a facial gesture (frown, smile) or make some physical movement (hand gesture) to access or control a certain network entity. It is to be understood that any type of I/O modality may be used for inputting user gestures, depending on the configuration and resources of the access device.

The access device will process the user input gesture to translate or otherwise map the input user gesture to a relevant command (conversational gesture) to invoke the command (step 53) and then submit the relevant bit string to the target entity (step 54).

It is to be appreciated that in one exemplary embodiment of the invention, the access device is a multi-modal device and that various user gestures can be mapped to a given command (conversational gesture) in accordance with the user preferences (type of commands, user language, etc.). By way of example, the relevant commands (gestures) for a lamp (conversational appliance) can be "Switch on" and "Switch off", and such commands can be rendered in "Switch on" or "Switch off" as well as "allumer" and "eteindre", or other languages. Moreover, by way of example, based on the pre-specified user preferences and transformation specifications, the elementary commands "switch on" can be invoked by one of multiple user gestures. For instance, the command "switch on" can be invoked by the user verbally uttering a desired command (e.g., "on") in the user's language, or by the user entering such command in a GUI field or selecting a particular icon, or by, e.g., the user "winking" into a video camera of the access device. In all instances, the user access device with translate or map the input user gestures to a corresponding command (conversational gesture) as specified by, e.g., the preloaded user preferences and/or transformation specifications. For a speech command, the user access device can perform speech recognition locally, or speech recognition can be performed remotely where the speech input is coded and shipped to a speech server having the necessary resources/data files, and where the results are shipped back to the access device for further processing.

The step of processing the input user gesture may further include context ambiguity resolution for UIs that support free flow, natural language understanding. For instance, a user may utter a command "switch on" to activate a remotely controlled light in a distributed network. However, another entity in the distributed network may be a computer that is responsive to the command "Switch On". In such instance, the dialog manager of the access device may query the user to determine the object of the input user command and disambiguate the input user command. For instance, the access device may "ask" the user (either via synthesized speech, or GUI query) if the user is "referring to the light or to the computer". In other instances, the dialog manager may determine the object of the command by maintaining a context history (e.g., a history of command, actions, queries, etc.), as is understood by those of ordinary skill in the art. For instance, if the user utters a command to "switch on the light" (which is stored in the context history), if the user subsequently utters "switch off", the dialog manager may understand the object of the command to refer to the light given the previous context (stored in the context history) was associated with the light.

As noted above, exemplary embodiments of the transformation specifications that enable adaptation of the interaction dialog based on the user preferences, user language, device characteristics, regional setting, etc. can be preloaded in the client access device and include, for example, XSL transformation rules of conversational gestures written using an interaction-based markup language (IML) or beans with rendering faces with interaction-based dialog components for imperative programming. Moreover, based on language identification, or preferences of the user, new XSL transformation rules can be downloaded for each gesture from a remote server, which is either a shared generic server, a a server that is redirected to in an IML page by the content/service provider, for example. Such XSL rules can direct the browser of the client device to operate in a networked mode, when the local engines of the access device cannot handle the language. Furthermore, engines that operate in international phonology or engines that are able to handle other languages can be instructed to download (if practical) the data files from an appropriate server. For language or localization, it is desirable that locale identifiers conform to existing ISO and/or IETF standards for countries and locales.

Figure 6:
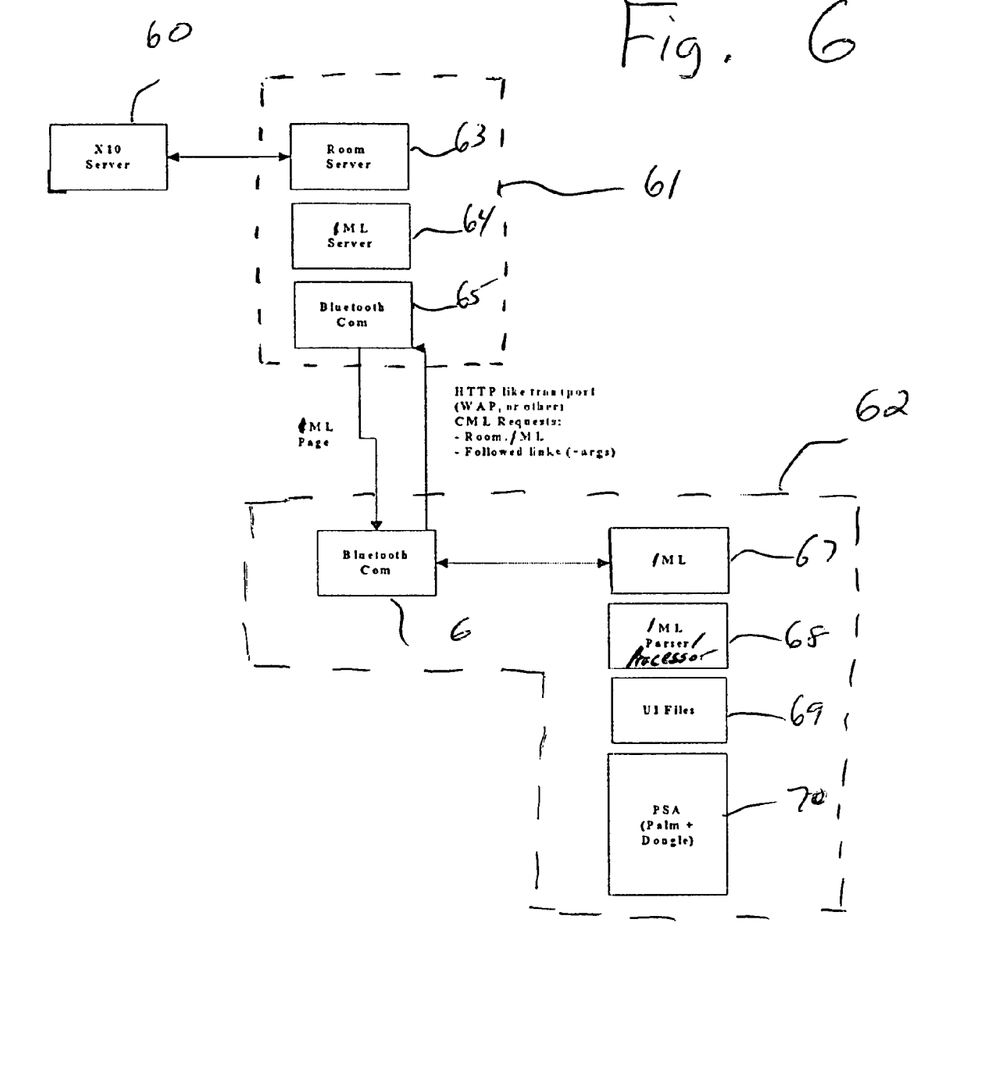
FIG. 6 is a diagram of a system for providing conversational communication with entities in a distributed network according to another exemplary embodiment of the invention.

Referring now to FIG. 6, a block diagram illustrates a system according to another exemplary embodiment of the present invention for providing conversational communication with entities in a distributed multi-modal environment. More specifically, the exemplary system in FIG. 6 illustrates an extension of the known X10 protocol. X10 is a communications language that allows devices to communicate using existing high-voltage electrical wiring in a home or building, for example. In an X10 system, a transmitter which is plugged in or hardwired at one location in a home (or building) can send control signals (e.g., on, off, dim, bright, etc. for one or more lights) to a receiver which is plugged in (or hardwired) at another location in the home or building to remotely control a device.

In general, the exemplary system of FIG. 6 generally comprises an X10 server (60), an interface system (61) and a universal conversational remote control device (62) (or UCRCD). The X10 server (60) receives and processes conversational commands from the interface system (61) and converts the conversational commands to appropriate X10 commands for controlling desired X10 appliances (not shown) such as lights, etc. The interface system (61) provides an interface between the X10 server (60) and the UCRCD (62). The interface system (61) acts as a gateway that transmits and transcodes the protocols between the X10 system and the UCRCD (62). In one exemplary embodiment, the UCRCD (62) comprises a speech enabled portable PDA with spontaneous networking capability such as RF, ad hoc (e.g., bluetooth, hopping networking) or IR.

The interface system (61) comprises a room server (63), a IML (or IML server) (64) and communications module (65). The room server (63) communicates with the X10 server (60) to provide the necessary communication and negotiation for enabling remote control of X10 appliances in an X10 network via the UCRCD (62). The IML server (64) will provide corresponding IML pages to the UCRCD (62), wherein the IML pages comprise the modality-independent conversational appliance gestures representing commands associated with the X10 controllable appliances within the environment. The communications module (65) implements a wireless communications protocol, such as Bluetooth, to enable wireless communication with any compatible UCRCD (62) that enters the networked environment.

The UCRCD (62) comprises a corresponding communications module (66) that enables communication with the interface system (61), a IML parser/processor (68) (dialog manager) that parses, processes and interprets IML pages (67) obtained from the IML server (64), and a user interface module (69) that renders the modality independent commands of a IML page (67) into one or more modalities supported by the device (62) (e.g., visual and/or speech). The IML processor/parser (68) also translates input gestures (e.g., spoken command) from the user to corresponding IML gestures. The UCRCD (62) further comprises a security mechanism (80) (such as DONGLE security key and corresponding verification application) to ensure that only authored individual can use the device (62) for remote control.

With the exemplary system of FIG. 6, X10 appliances that are connected to an x10 network in a home or building environment, for example, can be discovered by any compatible UCRCD (62) via the interface system (61) and exchange the necessary information to be conversationally controlled. The X10 appliances in a permanent X10 network are indirectly controlled by the UCRCD (62) via the X10 server (60) and the conversational interface system (61). The X10 server (60) stores registration information for each appliance that is within the X10 network. The X10 appliances register their supported commands with the X10 server (60) and possibly other relevant information such as return handles/events to return to the appliance upon activation. The conversational interface system (61) provides the modality-independent, language independent, regionalization/internationalization—independent representation of the supported commands. When a user enters a room, for example, the user's UCRCD (62) can be turned on, wherein the device (62) will periodically broadcast a request for handshake (discovery) via suitable conversational protocols (as discussed above) and the interface system (61) can answer when detecting such request. The resulting handshake leads to a registration of the UCRCD (62) and negotiation wherein it can be agreed, for example, that the UCRCD (62) drives the conversation. The UCRCD (62) will adapt the dialog and obtain the necessary vocabulary, baseforms, prompts/voice fonts for the dialog, grammars, etc. For instance, the IML page may direct the UCRD (62) to addresses of other engines that will perform the conversational engine tasks (e.g. a server that will perform the speech recognition task etc). Upon activation and input from the user, the UCRCD (62) can determines the corresponding appliance based on, e.g., recognition results according to the commands supported by different appliances, or by other mechanisms.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer readable medium embodying instructions executable by a processor to perform a method for providing conversational communication with entities in a network, the method comprising the steps of:

establishing connection to a distributed network using a client device;

obtaining, by the client device, from a server in the distributed network a list of one or more entities in the network and a description of one or more commands associated with the one or more entities that enable user interaction with the one or more entities in the distributed network, wherein the commands are written using an interaction-based programming language which is independent of user language, access channel, client device I/O (input/output) modality, regional settings and international settings;

receiving as input, by the client device, a user gesture for communicating with a target entity; and processing, by the client device, the user gesture using transformation rules to map the user gesture to a relevant command of the one or more commands obtained from the server and invoking, by the client device, the relevant command on the target entity.

* * * * *